US011066538B2

(12) United States Patent
Saito et al.

(10) Patent No.: US 11,066,538 B2
(45) Date of Patent: Jul. 20, 2021

(54) VINYL CHLORIDE-VINYL ACETATE COPOLYMER RESIN COMPOSITION

(71) Applicant: SHIRAISHI KOGYO KAISHA, LTD., Osaka (JP)

(72) Inventors: Hiroshi Saito, Takasago (JP); Nobuyoshi Murakami, Amagasaki (JP); Kanehiro Osakabe, Amagasaki (JP); Yoshisada Kayano, Osaka (JP)

(73) Assignee: SHIRAISHI KOGYO KAISHA, LTD., Osaka (JP)

( * ) Notice: Subject to any disclaimer, the term of this patent is extended or adjusted under 35 U.S.C. 154(b) by 0 days.

(21) Appl. No.: 16/497,887

(22) PCT Filed: Mar. 12, 2018

(86) PCT No.: PCT/JP2018/009379
§ 371 (c)(1),
(2) Date: Sep. 26, 2019

(87) PCT Pub. No.: WO2018/180393
PCT Pub. Date: Oct. 4, 2018

(65) Prior Publication Data
US 2020/0102443 A1    Apr. 2, 2020

(30) Foreign Application Priority Data

Mar. 27, 2017  (JP) .............................. JP2017-061026

(51) Int. Cl.
*C08K 9/04*       (2006.01)
*C08F 214/06*     (2006.01)
*C08K 3/26*       (2006.01)
*C08L 27/06*      (2006.01)

(52) U.S. Cl.
CPC .............. *C08K 9/04* (2013.01); *C08F 214/06* (2013.01); *C08K 3/26* (2013.01); *C08L 27/06* (2013.01); *C08K 2003/265* (2013.01); *C08K 2201/006* (2013.01)

(58) Field of Classification Search
CPC ...... C08K 9/04; C08K 3/26; C08K 2003/265; C08L 27/06; C08L 31/04; C08F 214/06
USPC ................................. 523/200; 524/425, 427
See application file for complete search history.

(56) References Cited

U.S. PATENT DOCUMENTS

| 5,015,669 | A  | 5/1991 | Aumann et al. | |
| 2012/0035312 | A1* | 2/2012 | Hasegawa et al. | C08K 9/10 |
| | | | | 524/394 |

| 2012/0309877 | A1 | 12/2012 | Fujiwara et al. |
| 2016/0039963 | A1 | 2/2016 | Fujikawa et al. |
| 2017/0342186 | A1 | 11/2017 | Fujikawa et al. |

FOREIGN PATENT DOCUMENTS

| CN | 102365236 A | 2/2012 | |
| CN | 102492310 A | 6/2012 | |
| EP | 2 412 673 A1 | 2/2012 | |
| JP | 48-015457 B1 | 5/1973 | |
| JP | 02-228349 A | 9/1990 | |
| JP | 02-255749 A | 10/1990 | |
| JP | 10-231380 A | 6/1998 | |
| JP | 11-293074 A | 10/1999 | |
| JP | 2002-167486 A | 6/2002 | |
| JP | 2003-105149 A | 4/2003 | |
| JP | 2005-336417 A | 12/2005 | |
| JP | 2007-169485 A | † | 7/2007 |
| JP | 2009-097175 A | 5/2009 | |
| JP | 2011-094134 A | 5/2011 | |
| JP | 2011-226581 A | 11/2011 | |
| JP | 2013-216863 A | 10/2013 | |
| JP | 2014-156525 A | † | 8/2014 |
| WO | 2008/062560 A1 | 5/2008 | |
| WO | 2011/099154 A1 | 8/2011 | |
| WO | 2014/141461 A | 9/2014 | |

OTHER PUBLICATIONS

Notification of Transmittal of Translation of the International Preliminary Report on Patentabililty (Form PCT/IB/338) issued in counterpart International Application No. PCT/JP2018/009379 dated Oct. 10, 2019 with Forms PCT/IB/373 and PCT/ISA/237. (7 pages).
International Search Report dated Apr. 28, 2018, corresponds to PCT/JP2018/009379 (2 pages).
Extended European Search Report dated Dec. 17, 2020, issued in counterpart EP Patent Application No. 18778097.8 (7 pages).
Office Action dated Apr. 22, 2021, issued in counterpart CN Application No. 201880021364.4, with English Translation. (12 pages).

* cited by examiner
† cited by third party

*Primary Examiner* — Hannah J Pak
(74) *Attorney, Agent, or Firm* — Westerman, Hattori, Daniels & Adrian, LLP

(57) ABSTRACT

A vinyl chloride-vinyl acetate copolymer resin composition which is excellent in storage stability and can reduce the baking temperature is provided. The vinyl chloride-vinyl acetate copolymer resin composition comprises: 70 to 300 parts by mass of surface-treated calcium carbonate obtained by surface-treating calcium carbonate with a fatty acid or a derivative thereof based on 100 parts by mass of a vinyl chloride-vinyl acetate copolymer resin having a vinyl acetate content of 8 to 12% by mass, and it is characterized in that a BET specific surface area of the surface-treated calcium carbonate is 10 to 40 $m^2/g$, and an amount of the calcium carbonate surface-treated is $0.1 \times 10^{-2}$ $g/m^2$ to $0.4 \times 10^{-2}$ $g/m^2$ per $m^2/g$ of the BET specific surface area of the surface-treated calcium carbonate.

2 Claims, No Drawings

VINYL CHLORIDE-VINYL ACETATE COPOLYMER RESIN COMPOSITION

TECHNICAL FIELD

The present invention relates to a vinyl chloride-vinyl acetate copolymer resin composition.

BACKGROUND ART

Vinyl chloride-vinyl acetate copolymer resin compositions such as vinyl chloride plastisol are used as sealing materials, undercoats or the like in the bodies of cars, or the like.

Patent Literature 1 discloses a vinyl chloride plastisol composition using a vinyl chloride-vinyl acetate copolymer having a vinyl acetate content of 3 to 8% by weight.

CITATION LIST

Patent Literature

Patent Literature 1: Japanese Patent Laid-Open No. 02-255749

SUMMARY OF INVENTION

Technical Problem

In recent years, reducing carbon dioxide emission has been required in view of the environment and the like, and vinyl chloride plastisol which can be baked at lower temperature has been desired. It is considered that the vinyl acetate content is increased as a method for reducing the baking temperature. There has been however a problem that the storage stability decreases when the vinyl acetate content is increased.

An object of the present invention is to provide a vinyl chloride-vinyl acetate copolymer resin composition which is excellent in storage stability and can reduce the baking temperature.

Solution to Problem

A vinyl chloride-vinyl acetate copolymer resin composition of the present invention is characterized by comprising 70 to 300 parts by mass of surface-treated calcium carbonate having calcium carbonate surface-treated with a fatty acid or a derivative thereof per 100 parts by mass of a vinyl chloride-vinyl acetate copolymer resin having a vinyl acetate content of 8 to 12% by mass, wherein the surface-treated calcium carbonate has a BET specific surface area of 10 to 40 $m^2/g$ and an amount for surface treatment ranging from $0.1\times10^{-2}$ $g/m^2$ to $0.4\times10^{-2}$ $g/m^2$ per $m^2/g$ of the BET specific surface area.

It is preferable that the vinyl chloride-vinyl acetate copolymer resin has a vinyl acetate content of 9 to 11% by mass.

The vinyl chloride-vinyl acetate copolymer resin composition of the present invention can be used as a paste sol.

Advantageous Effects of Invention

According to the present invention, the vinyl chloride-vinyl acetate copolymer resin composition can be a vinyl chloride-vinyl acetate copolymer resin composition which is excellent in storage stability and can reduce the baking temperature.

DESCRIPTION OF EMBODIMENTS

Preferred embodiments will be described hereinafter. The following embodiments are however mere illustrations, and the present invention is not limited to the following embodiments.

<Surface-Treated Calcium Carbonate>

The surface-treated calcium carbonate used in the present invention is surface-treated calcium carbonate wherein calcium carbonate is surface-treated with a fatty acid or a derivative thereof, the BET specific surface area is 10 to 40 $m^2/g$, and the surface treatment amount is $0.1\times10^{-2}$ $g/m^2$ to $0.4\times10^{-2}$ $g/m^2$ per $m^2/g$ of the BET specific surface area of the calcium carbonate.

(Calcium Carbonate)

Calcium carbonate as a raw material used for the surface-treated calcium carbonate of the present invention is not particularly limited, and, for example, conventionally well-known calcium carbonate can be used. Examples of such calcium carbonate include synthetic (sedimentary) calcium carbonate and heavy calcium carbonate. In the present invention, synthetic (sedimentary) calcium carbonate is preferably used.

Synthetic (sedimentary) calcium carbonate can be obtained by a well-known method such as a milk of lime-carbon dioxide reaction method, a calcium chloride-soda ash reaction method or a milk of lime-soda ash reaction method. When an example of the milk of lime-carbon dioxide reaction method is shown, limestone ore is subjected to multi-fuel firing with coke or petroleum fuels (heavy oil or light oil), natural gas, LPG and the like to form quick lime, this quick lime is hydrated to form calcium hydroxide slurry, this is bubbled and reacted with carbon dioxide generated at the time of the multi-fuel firing, and calcium carbonate can be produced. Desired particulates can be obtained by setting conditions at the time of the carbon dioxide reaction.

Calcium carbonate used in the present invention has a BET specific surface area of 10 to 40 $m^2/g$, which does not change greatly before and after surface treatment and is almost equivalent. The BET specific surface area is more preferably 10 to 30 $m^2/g$, and further preferably 10 to 20 $m^2/g$.

The BET specific surface areas of the calcium carbonate before and after surface treatment in the present invention are values measured using a surface area measuring apparatus (manufactured by Micromeritics Instrument Corp., FlowSorb II 2300).

(Surface Treatment)

Surface-treated calcium carbonate of the present invention is surface-treated with a fatty acid or a derivative thereof. Examples of the fatty acid or the derivative thereof include saturated and unsaturated fatty acids having 6 to 24 carbon atoms, and salts or esters thereof.

Examples of saturated or unsaturated fatty acids having 6 to 24 carbon atoms include stearic acid, palmitic acid, lauric acid, behenic acid, oleic acid, erucic acid and linoleic acid. Especially stearic acid, palmitic acid, lauric acid and oleic acid are preferably used. These may be used as a mixture of two or more.

Examples of the salts of the fatty acids include alkali metal salts such as sodium salts and potassium salts of the above-mentioned saturated or unsaturated fatty acids having around 6 to 24 carbon atoms. The carbon numbers of the salts of fatty acids are preferably around 10 to 20.

Examples of the esters of the fatty acids include esters of saturated or unsaturated fatty acids having 6 to 24 carbon atoms and lower alcohols having 6 to 18 carbon atoms.

For example, a method in which at least one of the fatty acids or derivatives thereof is added to a slurry containing calcium carbonate and water, the resulting mixture is then dehydrated and dried (wet process), or a similar method can be adopted as surface treatment. Examples of a specific method for surface-treating the calcium carbonate with an alkali metal salt of a fatty acid include the following method.

While a fatty acid is heated in an aqueous alkali metal solution such as an aqueous sodium hydroxide solution or an aqueous potassium hydroxide solution, the mixture is formed into an aqueous solution of the fatty acid in the alkali metal solution. Next, the aqueous solution of the fatty acid in the alkali metal solution is added to slurry of calcium carbonate and water, and stirred. The calcium carbonate can be surface-treated with the fatty acid thereby.

The solid content of the calcium carbonate in the slurry of calcium carbonate and water may be optionally adjusted in view of the average particle size of calcium carbonate, the dispersibility of calcium carbonate in the slurry, the ease of dehydrating the slurry, and the like. A suitably viscous slurry can be generally formed by adjusting the solid content of the slurry around 2 to 30% by mass, and preferably around 5 to 20% by mass.

The slurry may be dehydrated, for example by a method such as filter pressing. Drying may be performed, for example, in a box-shaped drier.

Calcium carbonate may be surface-treated by a drying method. Examples of the drying method include a method in which a fatty acid which is a finishing agent is added to calcium carbonate with stirring calcium carbonate. The finishing agent may be added as a solution, and it may be added while calcium carbonate is heated to a temperature higher than the melting point of the finishing agent.

The BET specific surface area of the surface-treated calcium carbonate used in the present invention is 10 to 40 $m^2/g$. When the BET specific surface area is too small, high viscosity and excellent thixotropy may not be able to be imparted to a paste sol, and it is not preferable. When the BET specific surface area is too large, the dispersibility deteriorates, the appearance of the paste sol may be inferior, the viscosity is too high, and it is not therefore preferable. The BET specific surface area is preferably 10 to 30 $m^2/g$, and it is more preferably 10 to 20 $m^2/g$.

In the surface-treated calcium carbonate of the present invention, the amount for surface treatment is $0.1 \times 10^{-2}$ $g/m^2$ to $0.4 \times 10^{-2}$ $g/m^2$ per $m^2/g$ of the BET specific surface area of the surface-treated calcium carbonate. When the amount for surface treatment is less than $0.1 \times 10^{-2}$ $g/m^2$, the surface of calcium carbonate is partially untreated, an effect as calcium carbonate cannot be sufficiently exhibited, and it is not therefore preferable. When the amount for surface treatment is more than $0.4 \times 10^{-2}$ $g/m^2$, the storage stability of the paste sol deteriorates, and it is not therefore preferable. The production cost increases, it is disadvantageous economically, and it is not therefore preferable. The amount for surface treatment is preferably $0.1 \times 10^{-2}$ $g/m^2$ to $0.3 \times 10^{-2}$ $g/m^2$, and more preferably $0.1 \times 10^{-2}$ $g/m^2$ to $0.2 \times 10^{-2}$ $g/m^2$ per $m^2/g$ of the BET specific surface area of the surface-treated calcium carbonate.

The amount for surface treatment per $m^2/g$ of the BET specific surface area can be calculated from the following formula.

Amount for surface treatment per $m^2/g$ of BET specific surface area $(\times 10^{-2} \text{ g/m}^2) = A/B$ A: Weight loss on heating of surface-treated calcium carbonate (%)

B: BET specific surface area of surface-treated calcium carbonate $(m^2/g)$

The weight loss on heating of the surface-treated calcium carbonate is to measure the amount for surface treatment. While it is heated at a rate of temperature rise of 10° C./min from room temperature, it is weighed at 200° C. and further at 500° C. The weight loss on heating is calculated by the following formula from those values.

Weight loss on heating (%)=[(weight at 200° C. (g)−weight at 500° C. (g))/weight at 200° C. (g)]×100

<Vinyl Chloride-Vinyl Acetate Copolymer>

The vinyl chloride-vinyl acetate copolymer used in the present invention is obtained by producing a vinyl chloride monomer and a vinyl acetate monomer by emulsion polymerization, seeded emulsion polymerization, or microsuspension polymerization, and it is preferable that the average primary particle size before drying be 0.1 to 4 m.

The vinyl acetate content of the vinyl chloride-vinyl acetate copolymer used in the present invention is preferably 8 to 12% by mass, more preferably 8.5 to 11.5% by mass, and further preferably 9 to 11% by mass. When the vinyl acetate content is less than 8% by mass, the baking temperature may not be able to be reduced. When the vinyl acetate content is more than 12% by mass, the storage stability of the paste sol may deteriorate.

In emulsion polymerization, an anionic surfactant and/or a nonionic surfactant is used as an emulsifier, and a water-soluble peroxide, the combination of a water-soluble peroxide and a water-soluble reducing agent, or the combination of an oil-soluble peroxide and a water-soluble reducing agent is used as a polymerization initiator, a vinyl chloride-based monomer is emulsified and dispersed in an aqueous medium in the presence of other polymerization aids as micro droplets having an average particle size of around 0.1 to 0.4 m and polymerized in the state to produce a particulate polymer. Then, an unreacted vinyl chloride-based monomer and an unreacted vinyl acetate monomer are removed and collected, spray drying is performed, and a vinyl chloride-vinyl acetate copolymer which can be used in the present invention is obtained. A vinyl chloride-vinyl acetate copolymer which can be used in the present invention is obtained also by micro suspension polymerization in which the monomers are suspended as micro droplets having an average particle size of around 1 to 4 m and polymerized using a high-speed disperser such as a homogenizer.

Examples of the emulsifier (micro suspension dispersant) include usual anionic surfactants such as alkylsulfonates, alkyl allyl sulfonates, alkyl sulfate salts, fatty acid salts or dialkylsulfosuccinates, especially alkali metal salts. Examples of the non-ionic surfactant include glycerin esters, glycol esters or sorbitan esters of higher fatty acids, higher alcohol condensates, higher fatty acid condensates and a polypropylene oxide condensate.

Examples of a water-soluble polymerization initiator used in emulsion polymerization include peroxides such as hydrogen peroxide, ammonium persulfate, sodium perborate, potassium persulfate and sodium persulfate. Examples of an oil-soluble polymerization initiator include organic hydroperoxides such as t-butyl hydroperoxide, isopentyl hydroperoxide, cumene hydroperoxide, t-butylisopropylbenzene hydroperoxide and diisopropylbenzene hydroperoxide. Moreover, these may be used in combination with a suitable water-soluble reducing agent such as sodium hydrogen sulfite, sodium thiosulfate, sodium pyrosulfite or Rongalite.

As other polymerization aids, a higher alcohol such as cetyl alcohol or lauryl alcohol; a higher fatty acid such as lauryl acid, palmitic acid, or stearic acid or an ester thereof; an aromatic hydrocarbon; a higher aliphatic hydrocarbon; a halogenated hydrocarbon such as a chlorinated paraffin; polyvinyl alcohol; gelatin; a particle size regulator (sodium sulfate, sodium bicarbonate or the like); a chain transfer agent; a polymerization inhibitor; and the like can be used. These can be used alone or in combination of two or more.

Polymerization conditions of emulsion polymerization may be conditions usually adopted for producing of paste vinyl chloride resin, and they are not particularly limited.

A polymerization degree regulator, a chain transfer agent, a pH regulator, a gelation improver, an antistatic agent, an emulsifier, a stabilizer, a scale inhibitor and the like used conventionally at the time of the emulsion polymerization of a vinyl chloride-based monomer can also be used, and a method for charging with these may also be a well-known technique.

A vinyl chloride-vinyl acetate-based copolymer having an average particle size of around 0.4 to 2 m and obtained by enlarging particulates as cores (seed particles) by seeded emulsion polymerization in which emulsion polymerization is performed again in the presence of vinyl chloride-based polymer particulates beforehand produced by emulsion polymerization and having an ultramicro particle size can also be used in the present invention.

<Resin Composition>

In a resin composition of the present invention, 70 to 300 parts by mass of the above-mentioned surface-treated calcium carbonate is contained based on 100 parts by mass of the vinyl chloride-vinyl acetate copolymer resin. When the content of surface-treated calcium carbonate is less than 70 parts by mass, viscosity tends to be unable to be satisfactorily imparted to the plastisol. When the content of surface-treated calcium carbonate is more than 300 parts by mass, the viscosity of the plastisol increases, and the workability may deteriorate. The content of surface-treated calcium carbonate is preferably 70 to 250 parts by mass, and more preferably 100 to 200 parts by mass based on resin 100 parts by mass.

The vinyl chloride-vinyl acetate copolymer resin composition of the present invention can be used, for example, as a paste sol. A plasticizer may therefore be contained. When the plasticizer is contained, its content is preferably 50 to 350 parts by mass, more preferably 70 to 300 parts by mass, and further preferably 100 to 250 parts by mass based on 100 parts by mass of the vinyl chloride-vinyl acetate copolymer resin.

As the plasticizer, one or more plasticizers selected from phthalate plasticizers such as di-2-ethylhexyl phthalate (DOP), di-n-octyl phthalate, diisononyl phthalate (DINP) and dibutyl phthalate (DBP); phosphate plasticizers such as tricresyl phosphate (TCP), trixylyl phosphate (TXP) and triphenyl phosphate (TPP); fatty acid ester plasticizers such as di-2-ethylhexyl adipate (DEHA), di-2-ethylhexyl sebacate; polyacrylic plasticizers such as polybutyl acrylate, a n-butyl acrylate/methyl methacrylate copolymer, a 2-ethylhexyl acrylate/methyl methacrylate copolymer and a 2-ethylhexyl acrylate/methyl methacrylate/n-butyl methacrylate copolymer; and the like can be used.

Various additives such as a heat stabilizer, lubricant, a stabilizing auxiliary agent, a processing auxiliary agent, a filler, an antioxidant, a light stabilizer and a pigment can be added to the vinyl chloride-vinyl acetate copolymer resin composition of the present invention if needed. (a) a vinyl chloride resin produced and obtained by emulsion polymerization, seeded emulsion polymerization or micro suspension polymerization and having an average primary particle size of 0.1 to 4 μm; (b) a vinyl chloride resin for a paste blend or a vinyl chloride-vinyl acetate copolymer resin for a paste blend produced and obtained by suspension polymerization and having an average particle size of 20 to 60 μm; or the like can be blended in addition to the above-mentioned vinyl chloride-vinyl acetate copolymer resin as resin as long as effects of the present invention are not inhibited. Calcium carbonate such as heavy calcium carbonate may be blended as calcium carbonate in addition to the above-mentioned surface-treated calcium carbonate.

Examples

The present invention will be described more specifically by Examples hereinafter. This invention is not limited to the following embodiments.

(Preparation of Surface-Treated Calcium Carbonate)

Water was added to 2000 g of synthetic calcium carbonate having a predetermined BET specific surface area so that the solid content was 10% by mass, and the mixture was stirred at 40° C. to prepare slurry of calcium carbonate. Next, a solution of a mixed fatty acid sodium salt (at a mass ratio of lauric acid:myristic acid:palmitic acid:stearic acid:oleic acid=3:2:40:15:30, Tankaru MH produced by MIYOSHI OIL & FAT CO., LTD.) adjusted to 10% by mass was added to this slurry in a predetermined amount, and the calcium carbonate was surface-treated. Next, the obtained slurry was dehydrated to obtain a cake at a solid content of 60% by weight. The obtained cake was dried with a drier to obtain surface-treated calcium carbonate. The amount for surface treatment can be calculated by measuring the above-mentioned loss on heating by differential thermal analysis (TGD-9600 manufactured by ULVAC, Inc.).

(Production of Vinyl Chloride-Vinyl Acetate Copolymer)

<Copolymer a (Vinyl Acetate Content of 10% by Mass)>

To a 35-L pressure container deaerated sufficiently and replaced with $N_2$ were added 13.5 kg of a vinyl chloride monomer, 2.16 kg of a vinyl acetate monomer, 25.0 g of cumyl peroxyneodecanoate, 1.23 g of t-butyl peroxyneodecanoate, 27.3 g of stearyl alcohol, 90.0 g of a $C_{12}$ to $C_{18}$ alcohol, 347.5 g of sodium lauryl sulfate and 12.9 kg of water, and the mixture was homogenized for 30 minutes to obtain a homogenized liquid.

The number of revolutions of a stirrer was set as 29 rpm, the temperature was kept warm at 34° C. in the container, and polymerization was started. The monomers in the polymerizer were collected from the time when the pressure in the container began to decrease around 14 hours after, the inside of the container was cooled, and latex was discharged (the polymerization conversion ratio was around 77%).

The latex was dried using a spray drier (inlet temperature 105° C./outlet temperature 50° C.) to obtain a powdery vinyl chloride-vinyl acetate copolymer A.

<Copolymer B to Copolymer G>

As shown in Table 1, the same operation as for the copolymer A was performed except that the charged amounts of the vinyl chloride monomer and the vinyl acetate monomer were changed, and vinyl chloride-vinyl acetate copolymers B to G with different vinyl acetate contents were obtained.

TABLE 1

|  |  |  | Co-polymer A | Co-polymer B | Co-polymer C | Co-polymer D | Co-polymer E | Co-polymer F | Co-polymer G |
|---|---|---|---|---|---|---|---|---|---|
|  | Vinyl acetate content | (%) | 10 | 7 | 8 | 9 | 11 | 12 | 13 |
| Charged amount | Monomer — Vinyl chloride | (kg) | 13.5 | 14.2 | 14.0 | 13.8 | 13.3 | 13.0 | 12.7 |
|  | Vinyl acetate | (kg) | 2.16 | 1.46 | 1.71 | 1.89 | 2.45 | 2.49 | 2.83 |
|  | Initiator — Cumyl peroxyneodecanoate | (g) | 25 | 25 | 25 | 25 | 25 | 25 | 25 |
|  | t-Butyl peroxyneodecanoate | (g) | 1.23 | 1.23 | 1.23 | 1.23 | 1.23 | 1.23 | 1.23 |
|  | Higher alcohol — Stearyl alcohol | (g) | 27.3 | 27.3 | 27.3 | 27.3 | 27.3 | 27.3 | 27.3 |
|  | $C_{12}$ to $C_{18}$ alcohol | (g) | 90.0 | 90.0 | 90.0 | 90.0 | 90.0 | 90.0 | 90.0 |
|  | Emulsifier — Sodium lauryl sulfate | (g) | 347.5 | 347.5 | 347.5 | 347.5 | 347.5 | 347.5 | 347.5 |
|  | Water — Water | (kg) | 12.9 | 12.9 | 12.9 | 12.9 | 12.9 | 12.9 | 12.9 |
|  | Polymerization temperature | (° C.) | 34 | 34 | 34 | 34 | 34 | 34 | 34 |
|  | Polymerization time | (Hour) | 14 | 14 | 14 | 15 | 14 | 13 | 14 |
|  | Polymerization conversion ratio | (%) | 77 | 82 | 85 | 88 | 78 | 90 | 84 |

(Preparation of Vinyl Chloride-Vinyl Acetate Copolymer Resin Composition)

As shown in Table 1 to Table 4, the above obtained surface-treated calcium carbonate, heavy calcium carbonate, a plasticizer and various additives were blended with each of the vinyl chloride-vinyl acetate copolymers having a predetermined vinyl acetate content to prepare a paste sol of the vinyl chloride-vinyl acetate copolymers.

The basic formulation of the paste sol is as follows.

Vinyl chloride-vinyl acetate copolymer: 100 parts by mass

Surface-treated calcium carbonate: 143 parts by mass

Heavy calcium carbonate (produced by BIHOKU FUNKA KOGYO CO., LTD., BF300): 221 parts by mass Plasticizer (produced by New Japan Chemical Co., Ltd., DINP): 179 parts by mass Dehydrating agent (produced by BIHOKU FUNKA KOGYO CO., LTD., calcium oxides, CML35): 21 parts by mass Adhesion imparting agent (produced by Cognis Japan Ltd., polyamide amine, VERSAMID 140): 7 parts by mass Diluent (Yamakei Sangyo Ltd., petroleum solvent, MINERAL SPIRIT): 29 parts by mass Total: 700 parts by mass (Evaluation of Storage Stability)

The obtained paste sol was measured for viscosity as described below. The percent change of viscosity was calculated according to the equation described below and evaluated as the storage stability.

Initial viscosity and the percent change of viscosity after storage were used as indices of storage stability. The percent change of viscosity was calculated according to the following equation. The initial viscosity was measured with a B viscometer (20 rpm) as to a paste sol at 20° C. immediately after preparation. The paste sol was stored at 35° C. for 30 days and then left to stand at 20° C. for 3 hours or more, and the viscosity after storage was measured with the B viscometer (20 rpm).

Percent change of viscosity (%)=[(viscosity after storage (Pa·s))−initial viscosity (Pa·s))/initial viscosity (Pa·s)]×100

(Measurement of Tensile Strength)

A PP sheet was pasted on a glass plate, a glass spacer having a thickness of 3.0 mm was stuck on the sheet. The framework thereof was filled with a paste sol so that air bubbles do not enter the paste sol. The paste sol was cured at a predetermined set temperature to obtain a cured product.

The obtained sheet was punched with a dumbbell-like No. 2 shape prescribed in JIS K6251, a specimen was left to stand at 23° C. for 1 day or more, the thickness of the specimen was then measured, the specimen was tested at a tensile speed of 200 mm/min using an autograph, and the tensile strength was measured. The baking temperature is 120° C. except for Comparative Example 7. The baking temperature of Comparative Example 7 is 130° C.

<Influence of BET Specific Surface Area of Surface-Treated Calcium Carbonate>

Calcium carbonate raw materials having respective BET specific surface areas of 9 $m^2/g$ (Comparative Example 1), 13 $m^2/g$ (Example 2), 20 $m^2/g$ (Example 1), 28 $m^2/g$ (Example 3), 40 $m^2/g$ (Example 4) and 53 $m^2/g$ (Comparative Example 2) were surface-treated with the above-mentioned mixed fatty acid sodium salt so that the amounts for surface treatment were those amounts shown in Table 2 (the amounts for surface treatment of surface-treated calcium carbonate materials per $m^2/g$ of the BET specific surface area: unit ($\times 10^{-2}$ $g/m^2$)), and surface-treated calcium carbonate materials having BET specific surface areas of 8 $m^2/g$ (Comparative Example 1), 12 $m^2/g$ (Example 2), 18 $m^2/g$ (Example 1), 26 $m^2/g$ (Example 3), 35 $m^2/g$ (Example 4) and 41 $m^2/g$ (Comparative Example 2) were obtained, respectively.

Paste sols were produced as mentioned above using the obtained surface-treated calcium carbonate, and they were evaluated for storage stability and tensile strength.

Table 2 shows the evaluation result.

TABLE 2

|  |  | Comparative Example 1 | Example 2 | Example 1 | Example 3 | Example 4 | Comparative Example 2 |
|---|---|---|---|---|---|---|---|
| Copolymer | Blended amount (part by mass) | 100 | 100 | 100 | 100 | 100 | 100 |
|  | Vinyl acetate content (%) | 10 | 10 | 10 | 10 | 10 | 10 |

TABLE 2-continued

|  |  | Comparative Example 1 | Example 2 | Example 1 | Example 3 | Example 4 | Comparative Example 2 |
|---|---|---|---|---|---|---|---|
| Surface-treated calcium carbonate | Blended amount (part by mass) | 143 | 143 | 143 | 143 | 143 | 143 |
|  | BET specific surface area ($m^2/g$) | 8 | 12 | 18 | 26 | 35 | 41 |
|  | Surface treatment amount ($\times 10^{-2}$ $g/m^2$) | 0.16 | 0.16 | 0.16 | 0.16 | 0.16 | 0.30 |
| Heavy calcium carbonate | Blended amount (part by mass) | 221 | 221 | 221 | 221 | 221 | 221 |
|  | Baking temperature (° C.) | 120 | 120 | 120 | 120 | 120 | 120 |
| Storage stability | Initial viscosity (Pa · s) | 60 | 144 | 158 | 186 | 145 | 336 |
|  | Viscosity after 30 days (Pa · s) | 74 | 122 | 174 | 205 | 160 | 372 |
|  | Percent change of viscosity (%) | 23.3 | −15.3 | 10.1 | 10.2 | 9.3 | 10.7 |
| Tensile strength ($N/mm^2$) |  | 0.51 | 0.55 | 0.55 | 0.55 | 0.57 | 0.58 |

As shown in Table 2, it can be seen that even though a resin having a high vinyl acetate content is used in the copolymer resin compositions of Examples 1 to 4 according to the present invention, the paste sols have an excellent storage stability. In Comparative Example 1 using the surface-treated calcium carbonate having a BET specific surface area smaller than the range of the present invention, the percent change in viscosity of the paste sol is high, and the storage stability deteriorates. In Comparative Example 2 using the surface-treated calcium carbonate having a BET specific surface area larger than the range of the present invention, the viscosity of the paste sol is high.

<Influence of Amount for Surface Treatment of Surface-Treated Calcium Carbonate>

A calcium carbonate raw material having a BET specific surface area of 20 $m^2/g$ was surface-treated with the above-mentioned mixed fatty acid sodium salt so that the amounts for surface treatment were those amounts shown in Table 3 (amounts for treatment per $m^2/g$ of the BET specific surface area of calcium carbonate: unit ($\times 10^{-2}$ $g/m^2$)), and surface-treated calcium carbonate having a BET specific surface area of 18 $m^2/g$ was obtained.

Paste sols were produced as mentioned above using the obtained surface-treated calcium carbonate, and they were evaluated for storage stability and tensile strength. Table 3 shows the evaluation result.

TABLE 3

|  |  | Comparative Example 3 | Example 5 | Example 1 | Example 6 | Example 7 | Example 8 | Comparative Example 4 |
|---|---|---|---|---|---|---|---|---|
| Copolymer | Blended amount (part by mass) | 100 | 100 | 100 | 100 | 100 | 100 | 100 |
|  | Vinyl acetate content (%) | 10 | 10 | 10 | 10 | 10 | 10 | 10 |
| Surface-treated calcium carbonate | Blended amount (part by mass) | 143 | 143 | 143 | 143 | 143 | 143 | 143 |
|  | BET specific surface area ($m^2/g$) | 18 | 18 | 18 | 18 | 18 | 18 | 18 |
|  | Surface treatment amount ($\times 10^{-2}$ $g/m^2$) | 0.06 | 0.12 | 0.16 | 0.26 | 0.33 | 0.4 | 0.45 |
| Heavy calcium carbonate | Blended amount (part by mass) | 221 | 221 | 221 | 221 | 221 | 221 | 221 |
|  | Baking temperature (° C.) | 120 | 120 | 120 | 120 | 120 | 120 | 120 |
| Storage stability | Initial viscosity (Pa · s) | 175 | 151 | 158 | 196 | 294 | 284 | 288 |
|  | Viscosity after 30 days (Pa · s) | 114 | 131 | 174 | 217 | 330 | 341 | 416 |
|  | Percent change of viscosity (%) | −34.8 | −13.2 | 10.1 | 11.0 | 12.2 | 20.2 | 44.4 |
| Tensile strength ($N/mm^2$) |  | 0.75 | 0.70 | 0.55 | 0.51 | 0.49 | 0.49 | 0.47 |

As shown in Table 3, it can be seen that even though a resin having a high vinyl acetate content is used in the copolymer resin compositions of Examples 1 and 5 to 8 according to the present invention, the paste sols have an excellent storage stability. In Comparative Example 3 which uses surface-treated calcium carbonate having an amount for surface treatment smaller than the range of the present invention, the paste sol has a lower percent change of viscosity and a lower storage stability. In Comparative Example 4 which uses surface-treated calcium carbonate having an amount for surface treatment larger than the range of the present invention, the paste sol has a high percent change of viscosity and a lower storage stability.

<Influence of Vinyl Acetate Content of Vinyl Chloride-Vinyl Acetate Copolymer>

As shown in Table 4, surface-treated calcium carbonate having a BET specific surface area of 18 to 35 m²/g and an amount for surface treatment of $0.16 \times 10^{-2}$ g/m² (amount for treatment per m²/g of the BET specific surface area of calcium carbonate) was blended with each of vinyl chloride-vinyl acetate copolymers having vinyl acetate contents of 7% by mass (Comparative Example 5), 8% by mass (Example 9), 9% by mass (Example 10), 10% by mass (Example 1), 11% by mass (Example 11), 12% by mass (Example 12) and 13% by mass (Comparative Example 6) to produce paste sols as mentioned above, and they were evaluated for storage stability and tensile strength. Table 4 shows the evaluation result.

In Comparative Example 7, a vinyl chloride-vinyl acetate copolymer having a vinyl acetate content of 7% by mass, which is the same as Comparative Example 5, is used and the baking temperature is 130° C. In the other Examples and Comparative Examples, the baking temperature is 120° C.

TABLE 4

|  |  | Comparative Example 5 | Example 9 | Example 10 | Example 1 | Example 11 | Example 12 | Comparative Example 6 | Comparative Example 7 |
|---|---|---|---|---|---|---|---|---|---|
| Copolymer | Blended amount (part by mass) | 100 | 100 | 100 | 100 | 100 | 100 | 100 | 100 |
|  | Vinyl acetate content (%) | 7 | 8 | 9 | 10 | 11 | 12 | 13 | 7 |
| Surface-treated calcium carbonate | Blended amount (part by mass) | 143 | 143 | 143 | 143 | 143 | 143 | 143 | 143 |
|  | BET specific surface area (m²/g) | 18 | 18 | 18 | 18 | 35 | 35 | 35 | 18 |
|  | Surface treatment amount ($\times 10^{-2}$ g/m²) | 0.16 | 0.16 | 0.16 | 0.16 | 0.16 | 0.16 | 0.16 | 0.16 |
| Heavy calcium carbonate | Blended amount (part by mass) | 221 | 221 | 221 | 221 | 221 | 221 | 221 | 221 |
| Baking temperature (° C.) |  | 120 | 120 | 120 | 120 | 120 | 120 | 120 | 130 |
| Storage stability | Initial viscosity (Pa · s) | 144 | 154 | 145 | 158 | 168 | 153 | 162 | 144 |
|  | Viscosity after 30 days (Pa · s) | 108 | 122 | 127 | 174 | 280 | 388 | 624 | 108 |
|  | Percent change of viscosity (%) | −25.0 | −20.8 | −12.4 | 10.1 | 66.7 | 153.6 | 285.2 | −25.0 |
| Tensile strength (N/mm²) |  | 0.40 | 0.63 | 0.57 | 0.55 | 0.77 | 0.81 | 0.90 | 0.55 |

As shown in Table 4, it can be seen that in the copolymer resin compositions of Examples 1 and 9 to 12 according to the present invention, the paste sols have an excellent storage stability and a high tensile strength. In Comparative Example 5 using a copolymer resin having a vinyl acetate content lower than the range of the present invention, baking is insufficient, the tensile strength is low. In this copolymer resin, the baking temperature needs to be increased to obtain high tensile strength as shown in Comparative Example 7. In Comparative Example 6 using a copolymer resin having a vinyl acetate content higher than the range of the present invention, the percent change of viscosity of the paste sol is high, and the storage stability deteriorates.

<Influence of Amount of Surface-Treated Calcium Carbonate Blended>

As shown in Table 5, the amount of surface-treated calcium carbonate blended was varied to 0 (Comparative Example 8), 50 (Comparative Example 9), 71 (Example 13), 114 (Example 14), 143 (Example 1), 171 (Example 15), 214 (Example 16) and 321 (Comparative Example 10). Each amount thereof was blended with a vinyl chloride-vinyl acetate copolymer to produce a paste sol as mentioned above, and it was evaluated for storage stability and tensile strength. Table 5 shows the evaluation result.

TABLE 5

|  |  | Comparative Example 8 | Comparative Example 9 | Example 13 | Example 14 | Example 1 | Example 15 | Example 16 | Comparative Example 10 |
|---|---|---|---|---|---|---|---|---|---|
| Copolymer | Blended amount (part by mass) | 100 | 100 | 100 | 100 | 100 | 100 | 100 | 100 |
|  | Vinyl acetate content (%) | 10 | 10 | 10 | 10 | 10 | 10 | 10 | 10 |
| Surface-treated calcium carbonate | Blended amount (part by mass) | 0 | 50 | 71 | 114 | 143 | 171 | 214 | 321 |
|  | BET specific surface area ($m^2/g$) | 18 | 18 | 18 | 18 | 18 | 18 | 18 | 18 |
|  | Surface treatment amount ($\times 10^{-2}$ $g/m^2$) | 0.16 | 0.16 | 0.16 | 0.16 | 0.16 | 0.16 | 0.16 | 0.16 |
| Heavy calcium carbonate | Blended amount (part by mass) | 364 | 314 | 293 | 250 | 221 | 193 | 78 | 43 |
| Baking temperature (° C.) |  | 120 | 120 | 120 | 120 | 120 | 120 | 120 | 120 |
| Storage stability | Initial viscosity (Pa · s) | 2.6 | 16 | 39 | 104 | 158 | 218 | 304 | 712 |
|  | Viscosity after 30 days (Pa · s) | 5.4 | 21 | 43 | 97 | 174 | 198 | 280 | 698 |
|  | Percent change of viscosity (%) | 107.7 | 31.3 | 10.3 | −6.7 | 10.1 | −9.2 | −8.2 | −2.0 |
| Tensile strength ($N/mm^2$) |  | — | 0.50 | 0.52 | 0.57 | 0.55 | 0.60 | 0.59 | 0.52 |

As shown in Table 5, it can be seen that in the copolymer resin compositions of Examples 1 and 13 to 16 according to the present invention, the paste sols have an excellent storage stability and a high tensile strength. In Comparative Example 8 and Comparative Example 9 using copolymer resins having smaller amounts of surface-treated calcium carbonate blended than the range of the present invention, the viscosities of the paste sols are too low. In Comparative Example 10 using a copolymer resin having a larger amount of surface-treated calcium carbonate blended than the range of the present invention, the initial viscosity of the paste sol is too high.

<Combined Use of Blend Resin>

A blend resin having a vinyl acetate content of 3% by mass (Examples 17 to 20) or a blend resin having a vinyl acetate content of 0% by mass (Examples 21 to 24) was used in combination with a vinyl chloride-vinyl acetate copolymer of the present invention having a vinyl acetate content of 10% by mass at blending ratios shown in Table 6. The specific blending ratio (copolymer:blend resin for combination) was 95:5 (Examples 17 and 21), 90:10 (Examples 18 and 22), 80:20 (Examples 19 and 23) and 75:25 (Examples 20 and 24), paste sols were produced as mentioned above, and the storage stabilities and the tensile strengths were evaluated. Table 6 shows the evaluation result.

TABLE 6

|  |  | Example 17 | Example 18 | Example 19 | Example 20 | Example 21 | Example 22 | Example 23 | Example 24 |
|---|---|---|---|---|---|---|---|---|---|
| Copolymer | Blended amount (part by mass) | 95 | 90 | 80 | 75 | 95 | 90 | 80 | 75 |
|  | Vinyl acetate content (%) | 10 | 10 | 10 | 10 | 10 | 10 | 10 | 10 |
| Blend resin for combination | Blended amount (part by mass) | 5 | 10 | 20 | 25 | 5 | 10 | 20 | 25 |
|  | Vinyl acetate content (%) | 3 | 3 | 3 | 3 | 0 | 0 | 0 | 0 |
| Surface-treated calcium carbonate | Blended amount (part by mass) | 143 | 143 | 143 | 143 | 143 | 143 | 143 | 143 |
|  | Blended amount based on 100 parts by mass of copolymer (part by mass) | 151 | 159 | 179 | 191 | 151 | 159 | 179 | 191 |
|  | BET specific surface area ($m^2/g$) | 18 | 18 | 18 | 18 | 18 | 18 | 18 | 18 |
|  | Surface treatment amount ($\times 10^{-2}$ $g/m^2$) | 0.16 | 0.16 | 0.16 | 0.16 | 0.16 | 0.16 | 0.16 | 0.16 |
| Heavy calcium carbonate | Blended amount (part by mass) | 221 | 221 | 221 | 221 | 221 | 221 | 221 | 221 |

TABLE 6-continued

|  | | Example 17 | Example 18 | Example 19 | Example 20 | Example 21 | Example 22 | Example 23 | Example 24 |
|---|---|---|---|---|---|---|---|---|---|
| Baking temperature (° C.) | | 120 | 120 | 120 | 120 | 120 | 120 | 120 | 120 |
| Storage stability | Initial viscosity (Pa · s) | 164 | 162 | 160 | 157 | 163 | 165 | 163 | 160 |
|  | Viscosity after 30 days (Pa · s) | 158 | 158 | 127 | 126 | 146 | 154 | 130 | 123 |
|  | Percent change of viscosity (%) | −3.7 | −2.5 | −20.6 | −19.7 | −10.4 | −6.7 | −20.2 | −23.1 |
| Tensile strength (N/mm$^2$) | | 0.51 | 0.54 | 0.49 | 0.50 | 0.53 | 0.52 | 0.49 | 0.48 |

As shown in Table 6, it can be seen that also when a blend resin having a vinyl acetate content lower than the range of the present invention is used in combination, the effect of the present invention that the paste sols have an excellent storage stability and a high tensile strength is obtained.

The invention claimed is:

1. A vinyl chloride-vinyl acetate copolymer resin composition, comprising 70 to 143 parts by mass of surface-treated calcium carbonate having calcium carbonate surface-treated with a fatty acid or a derivative thereof per 100 parts by mass of a vinyl chloride-vinyl acetate copolymer resin having a vinyl acetate content of 8 to 12% by mass, wherein the surface-treated calcium carbonate has a BET specific surface area of 10 to 40 m$^2$/g and an amount for surface treatment ranging from $0.1 \times 10^{-2}$ g/m$^2$ to $0.4 \times 10^{-2}$ g/m$^2$ per m$^2$/g of the BET specific surface area, and wherein the composition is a paste sol containing 100 to 250 parts by mass of plasticizer based on 100 parts by mass of the vinyl chloride-vinyl acetate copolymer resin.

2. The vinyl chloride-vinyl acetate copolymer resin composition according to claim 1, wherein the vinyl chloride-vinyl acetate copolymer resin has a vinyl acetate content of 9 to 11% by mass.

* * * * *